(12) United States Patent
You

(10) Patent No.: US 10,752,223 B2
(45) Date of Patent: Aug. 25, 2020

(54) AUTONOMOUS EMERGENCY BRAKING SYSTEM AND METHOD FOR VEHICLE AT CROSSROAD

(71) Applicant: MANDO CORPORATION, Pyeongtaek-si, Gyeongi-do (KR)

(72) Inventor: Kwan Sun You, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/217,880

(22) Filed: Dec. 12, 2018

(65) Prior Publication Data
US 2019/0263367 A1 Aug. 29, 2019

(30) Foreign Application Priority Data
Feb. 27, 2018 (KR) .......................... 10-2018-0023792

(51) Int. Cl.
*B60T 7/22* (2006.01)
*B60T 8/171* (2006.01)
(Continued)

(52) U.S. Cl.
CPC ................ *B60T 7/22* (2013.01); *B60T 8/171* (2013.01); *B60T 8/58* (2013.01); *B60W 30/09* (2013.01);
(Continued)

(58) Field of Classification Search
CPC .............. B60T 7/22; B60T 8/171; B60T 8/58
See application file for complete search history.

(56) References Cited

U.S. PATENT DOCUMENTS 9,390,624 B2 * 7/2016 Minemura ............. G08G 1/166
9,925,980 B2 * 3/2018 Edo-Ros ........... B60W 30/0956
(Continued)

FOREIGN PATENT DOCUMENTS

JP   2004-199494 A    7/2004
JP   2008-242544 A   10/2008
(Continued)

OTHER PUBLICATIONS

A. Eidehall, et al., "A New Approach to Lane Guidance Systems", 2005 IEEE Intelligent Transportation Systems Conference (ITSC), EEE, Sep. 13, 2005, pp. 766-770, Piscataway, NJ.
(Continued)

*Primary Examiner* — Ramsey Refai
(74) *Attorney, Agent, or Firm* — Morgan, Lewis & Bockius LLP

(57) ABSTRACT

An autonomous emergency braking (AEB) system includes a vehicle dynamics sensor and an around-view monitoring (AVM) sensor. The AVM sensor detects a distance and relative speed between the host vehicle and a peripheral object, or transmits an image of a peripheral region of the host vehicle to the ECU. The ECU receives detection signals from the sensors, determines the presence or absence of a moving object approaching in a direction transverse to a traveling direction of the host vehicle at crossroads during driving of the host vehicle, selects the detected moving object as a control object using the detected moving object detection information if the presence of the approaching moving object is determined, and warns a driver of the host vehicle about a high possibility of collision with the selected control object or performs autonomous emergency braking (AEB) of the host vehicle.

14 Claims, 5 Drawing Sheets

(51) Int. Cl.
*B60T 8/58* (2006.01)
*G08G 1/16* (2006.01)
*B60W 30/18* (2012.01)
*B60W 50/14* (2020.01)
*B60W 30/09* (2012.01)
*B60W 30/095* (2012.01)

(52) U.S. Cl.
CPC .... *B60W 30/095* (2013.01); *B60W 30/18154* (2013.01); *B60W 50/14* (2013.01); *G08G 1/166* (2013.01); *B60T 2250/04* (2013.01); *B60W 2420/52* (2013.01); *B60W 2420/62* (2013.01); *B60W 2554/80* (2020.02)

(56) References Cited

U.S. PATENT DOCUMENTS

| | | | |
|---|---|---|---|
| 10,262,534 B2 * | 4/2019 | Okada | G08G 1/096725 |
| 2004/0193347 A1 | 9/2004 | Harumoto et al. | |
| 2008/0243389 A1 | 10/2008 | Inoue et al. | |
| 2010/0030474 A1 * | 2/2010 | Sawada | B62D 15/0265 |
| | | | 701/301 |
| 2012/0206483 A1 * | 8/2012 | Funabashi | G09B 29/10 |
| | | | 345/629 |
| 2013/0261952 A1 * | 10/2013 | Aso | B60W 30/0956 |
| | | | 701/301 |
| 2014/0125474 A1 * | 5/2014 | Gunaratne | G08G 1/163 |
| | | | 340/439 |
| 2014/0222326 A1 * | 8/2014 | Sato | G08G 1/166 |
| | | | 701/301 |
| 2014/0358392 A1 * | 12/2014 | Shimizu | G08G 1/166 |
| | | | 701/70 |
| 2016/0114800 A1 * | 4/2016 | Shimizu | B60W 30/14 |
| | | | 701/70 |
| 2016/0280134 A1 * | 9/2016 | Miura | B60Q 9/008 |
| 2016/0335892 A1 * | 11/2016 | Okada | B60T 7/22 |
| 2017/0106750 A1 | 4/2017 | Tauchi et al. | |
| 2018/0182247 A1 * | 6/2018 | Baba | G06K 9/00791 |

FOREIGN PATENT DOCUMENTS

| | | |
|---|---|---|
| JP | 2010-39603 A | 2/2010 |
| JP | 4720355 B2 | 7/2011 |
| JP | 4814928 B2 | 11/2011 |
| JP | 2015-5113 A | 1/2015 |
| KR | 10-2017-0040955 A | 4/2017 |

OTHER PUBLICATIONS

Office Action issued in corresponding Korean Application No. 10-2018-0023792, dated Jun. 12, 2019.
Extended Search Report issued in corresponding European Application No. 18213758.8, dated Jun. 19, 2019.

* cited by examiner

AUTONOMOUS EMERGENCY BRAKING SYSTEM AND METHOD FOR VEHICLE AT CROSSROAD

CROSS-REFERENCE TO RELATED APPLICATION

This application is based on and claims priority under 35 U.S.C. § 119 to Korean Patent Application No. 10-2018-0023792, filed on Feb. 27, 2018 in the Korean Intellectual Property Office, the disclosure of which is incorporated herein by reference in its entirety.

BACKGROUND

1. Field

Embodiments of the present disclosure relate to an autonomous emergency braking (AEB) system and method for a vehicle at crossroads, and more particularly to an autonomous emergency braking (AEB) system and method for a vehicle at crossroads, which recognize a vehicle or pedestrian moving in a horizontal direction at crossroads, and increase driving safety and stability by warning a driver of the vehicle about the recognized vehicle or pedestrian or by performing autonomous emergency braking.

2. Description of the Related Art

Generally, when a dangerous obstacle such as a leading moving object (e.g., a movable device such as a vehicle) or an external object (e.g., a moving person such as a pedestrian, or fixed installations such as precast pavers, guardrails, and curbs) is detected in a forward region of a vehicle during vehicle driving, an Autonomous Emergency Braking (AEB) system may determine a forward obstacle to be a control object using the detected dangerous obstacle detection information, and may warn a driver of a dangerous situation having a high possibility of collision when there is a high possibility of collision with the dangerous obstacle. If necessary, the AEB system performs autonomous emergency braking to prevent the vehicle from colliding with any obstacle. The AEB application fields have recently been increased and standardized, such that many developers and companies are conducting intensive research into the advanced evolved AEB system that is capable of extending utility and effectiveness in a manner that the advanced AEB system can operate in many more scenarios than the conventional AEB system, and guaranteeing higher safety and stability than the conventional AEB system in a manner that the advanced AEB system can prevent the vehicle from colliding with any obstacle.

Specifically, the conventional AEB system may recognize the presence or absence of peripheral vehicles using a fusion of front sensors designed to detect the presence or absence of peripheral vehicles present in forward longitudinal regions of a host vehicle, and may determine movement of the recognized peripheral vehicles (i.e., preceding vehicles), such that the conventional AEB system can intensively control the detected preceding vehicles. However, as the AEB systems have been extended to many more applications, advanced safety systems have recently been developed and established by law, which can warn a vehicle driver about the oncoming vehicle moving in a horizontal direction at crossroads or about a pedestrian running in a horizontal direction at crossroads, or can perform autonomous emergency braking, resulting in vehicle safety and stability and greater user convenience. Thus, a method for allocating different priorities to dangerous obstacles moving in a horizontal direction at crossroads, and selecting a control object from among the dangerous obstacles is of importance.

Therefore, there is needed a technology for solving limitations of the conventional AEB system in terms of utilities and efficiency of the conventional AEB system, determining the possibility of collision with an oncoming obstacle moving in a horizontal direction at crossroads, and determining priority to the corresponding obstacle.

SUMMARY

Therefore, it is an aspect of the present disclosure to provide an autonomous emergency braking (AEB) system and method of a vehicle at crossroads, which allocate priority to one or more moving objects when the moving objects moving in a direction transverse to a traveling direction of a vehicle are detected at crossroads, and select a control object from among the moving objects, resulting in increased driving safety of the vehicle.

Additional aspects of the disclosure will be set forth in part in the description which follows and, in part, will be apparent to those of skill in the art upon understanding of the description, or may be learned by practice of the disclosure.

In accordance with an aspect of the present disclosure, an autonomous emergency braking (AEB) system includes a vehicle dynamics sensor, an around-view monitoring (AVM) sensor, and an electronic control unit (ECU). The vehicle dynamics sensor detects a driving speed of a host vehicle, and transmits the detected driving speed to the ECU. The AVM sensor detects a distance and relative speed between the host vehicle and a peripheral object, or transmits an image of a peripheral region of the host vehicle to the ECU. The ECU receives detection signals from the sensors, determines the presence or absence of a moving object approaching in a direction transverse to a traveling direction of the host vehicle at crossroads during driving of the host vehicle, selects the detected moving object as a control object using the detected moving object detection information when the presence of the approaching moving object is determined, and warns a driver of the host vehicle about a high possibility of collision with the selected control object or performs autonomous emergency braking (AEB) of the host vehicle according to information about a possibility of collision with the selected control object.

The electronic control unit (ECU) may primarily calculate the possibility of collision with the control object by establishing a boundary according to a driving speed of the host vehicle, may secondarily calculate the possibility of collision with a second object by estimating a position of the second object, may compare the primarily-calculated possibility of collision with the secondarily-calculated possibility of collision, and may warn the driver of the host vehicle about the high possibility of collision or may perform autonomous emergency braking (AEB) with respect to a higher one of the primarily-calculated possibility of collision and the secondarily-calculated possibility of collision.

If one or more moving object approaching in a direction transverse to the traveling direction of the host vehicle at crossroads are detected, the electronic control unit (ECU) may select a control object from among the detected moving objects by allocating different priorities to the detected moving objects, and may warn the driver of the host vehicle about the high possibility of collision or may perform autonomous emergency braking (AEB) according to information about the possibility of collision with the selected control object.

The electronic control unit (ECU) may primarily calculate the possibility of collision with the control object by establishing a boundary according to a driving speed of the host vehicle, may secondarily calculate the possibility of collision with one or more second objects by estimating the position of each second object, may compare the primarily-calculated possibility of collision with the secondarily-calculated possibility of collision, may determine priorities of the second objects with respect to a higher one of the primarily-calculated possibility of collision and the secondarily-calculated possibility of collision, may select a control object from among the second objects, and may warn the driver about the high possibility of collision or may perform autonomous emergency braking (AEB) with respect to the selected higher possibility of collision.

The electronic control unit (ECU) may determine a host-vehicle size and a counterpart-vehicle size, that are estimated based on widths of the host vehicle and the second object with respect to movement directions of the host vehicle and the second object, to be diameters of two circles, respectively, may acquire two straight lines contacting a crossroad from among the two circles, may acquire a sum of the diameters of the two circles with respect to not only a contact point of the two straight lines but also a center point of a width of a front surface of the host vehicle, and may thus generate a boundary, a diameter of which is set to the sum of the diameters of the two circles.

The electronic control unit (ECU) may calculate a specific time at which the host vehicle meets the second object at a traveling-direction position of the host vehicle, and may estimate the position of the second object at a horizontal-direction position with respect to the traveling direction of the host vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Advantages and features of the present disclosure and a method of achieving the advantages and features of the present disclosure will be clearly understood from embodiments described hereinafter in conjunction with the accompanying drawings. However, the present disclosure is not limited to the following embodiments and may be realized in various different forms. These embodiments are provided only to completely disclose the present disclosure and for a person having ordinary skill in the art to which the present disclosure pertains to completely understand the category of the disclosure. That is, the present disclosure is defined only by the claims. The same reference numbers will be used throughout this specification to refer to the same parts.

An autonomous emergency braking (AEB) system and method for a vehicle at crossroads according to an embodiment of the present disclosure will hereinafter be described with reference to the attached drawings.

Figure 1:
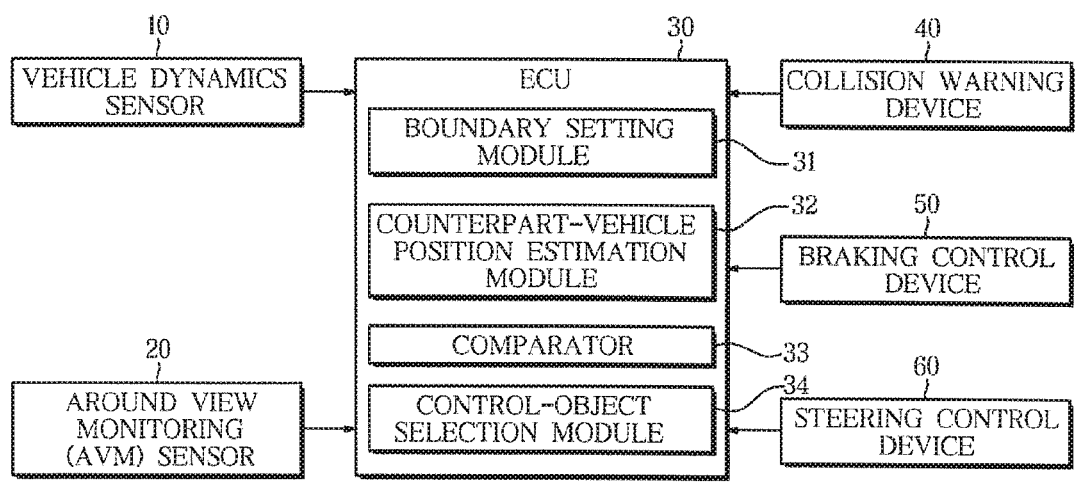
FIG. 1 is a block diagram illustrating an autonomous emergency braking (AEB) system according to an embodiment of the present disclosure.

FIG. 1 is a block diagram illustrating an autonomous emergency braking (AEB) system according to an embodiment of the present disclosure.

Referring to FIG. 1, the AEB system may include a vehicle dynamics sensor 10, an Around View Monitoring (AVM) sensor 20, an electronic control unit 30, a collision warning device 40, a braking control device 50, and a steering control device 60.

The vehicle dynamics sensor 10 may be implemented as one or more sensors, for example, a wheel speed sensor, an acceleration sensor, a yaw rate sensor, a steering angle sensor, etc. The vehicle dynamics sensor 10 may be arranged at proper positions of a host vehicle, for example, a wheel, a steering wheel, or the like, such that the vehicle dynamics sensor 10 may sense a driving speed, acceleration, yaw angular speed, a steering angle, etc. of the host vehicle, and may transmit the recognized information to the ECU 30.

The around view monitoring (AVM) sensor 20 may be implemented as one or more sensors, such as a radar sensor, an ultrasonic sensor, etc. The AVM sensor 20 may include a plurality of sensors. The sensors may be respectively installed at a center part of a front surface, a center part of a rear surface, and a corner part of a host vehicle, may emit electromagnetic waves within the range of a predetermined angle with respect to a forward lateral region of each sensor, may receive electromagnetic waves reflected from peripheral objects located in the vicinity of the host vehicle, and may detect an angle, a distance, a relative speed, a relative acceleration, etc. between the host vehicle and each peripheral object, such that the sensors of the AVM sensor 20 may transmit the detected information to the ECU 30. Alternatively, the AVM sensor 20 may also be implemented as one or more image sensors, for example, a near-infrared (NIR) camera, a Far Infrared Ray (FIR) camera, a CMOS camera (or a CCD camera), etc. The AVM sensor 20 may be arranged at an upper end of a windshield of a host vehicle, may sense and project various kinds of light, for example, infrared light, visible light, etc., within the range of a predefined angle and a predefined distance with respect to a forward lateral region of the host vehicle, may acquire an image of an external object located ahead of the host vehicle, and may transmit the acquired external object image to the ECU 30.

The ECU 30 may include a memory (e.g., DB) such as a Read Only Memory (ROM) or Random Access Memory (RAM), may store various control data, and may further include a processor such as a CPU, such that the ECU 30 may perform various control programs. The ECU 30 may receive detection signals from the vehicle dynamics sensor 10 and the AVM sensor 20. The various modules of the ECU 20 correspond to various functions performed by the processor by implementing program instructions of the control programs stored in the memory based on the information received by the ECU 20 from various sensors.

When the ECU 30 detects one or more moving objects approaching in a direction transverse to the traveling direction of the host vehicle at crossroads during driving of the host vehicle, the ECU 30 may select a control object from among the moving objects using the detected moving object detection information, may warn the driver of the high possibility of collision between the host vehicle and the selected control object according to information about the high possibility of collision with the selected control object, or may perform autonomous emergency braking (AEB) of the host vehicle as necessary.

Specifically, when the ECU 30 detects one or more moving objects approaching in a direction transverse to the traveling direction of the host vehicle at crossroads, the ECU 30 may select a control object from among the detected moving objects by allocating priorities to the detected moving objects, may warn the driver about the high possibility of collision with the selected control object according to information about the possibility of collision with the selected control object, or may perform autonomous emergency braking (AEB) of the host vehicle as necessary.

In more detail, the ECU 30 may include a boundary setting module 31, a module 32 for estimating the position of a second object, and a comparator 33. The boundary setting module 31 may establish a boundary according to a driving speed of the host vehicle, may primarily determine whether the possibility of collision between the host vehicle and a second object selected from among peripheral vehicles is high. The counterpart-vehicle position estimation module 32 may secondarily determine whether the possibility of collision with the second object is high by estimating the position of the second object. The comparator 33 may compare the primarily-calculated possibility of collision based on the driving speed of the host vehicle with the secondarily-calculated possibility of collision based on the estimated position of the second object. As a result, the ECU 30 may warn the driver about the high possibility of collision with peripheral objects with respect to a higher one of the primarily-calculated and secondarily-calculated collision possibilities, or may perform autonomous emergency braking (AEB) of the host vehicle as necessary.

Specifically, the ECU 30 may include a boundary setting module 31, a counterpart-vehicle position estimation module 323, a comparator 33, and a control-object selection module 34. The boundary setting module 31 may establish a boundary according to a driving speed of the host vehicle when one or more moving objects approaching in a direction transverse to the traveling direction of the host vehicle, such that the boundary setting module 31 may primarily determine whether the possibility of collision between the host vehicle and the moving object is high. The counterpart-vehicle position estimation module 32 may estimate the position of second objects, and may secondarily determine whether the possibility of collision with each second object is high. The comparator 33 may compare the primarily-calculated possibility of collision based on the driving speed of the host vehicle with the secondarily-calculated possibility of collision based on the estimated position of the second object. The control-object selection module 34 may allocate different priorities to the second objects with respect to a higher one from among the two possibilities of collision (i.e., the primarily-calculated possibility of collision and the secondarily-calculated possibility of collision), and may select a control object from among the second objects having different priorities. As a result, the ECU 30 may warn the driver about the high possibility of collision with respect to the possibility of collision with the selected control object, or may perform autonomous emergency braking (AEB) of the host vehicle as necessary.

Figure 4:
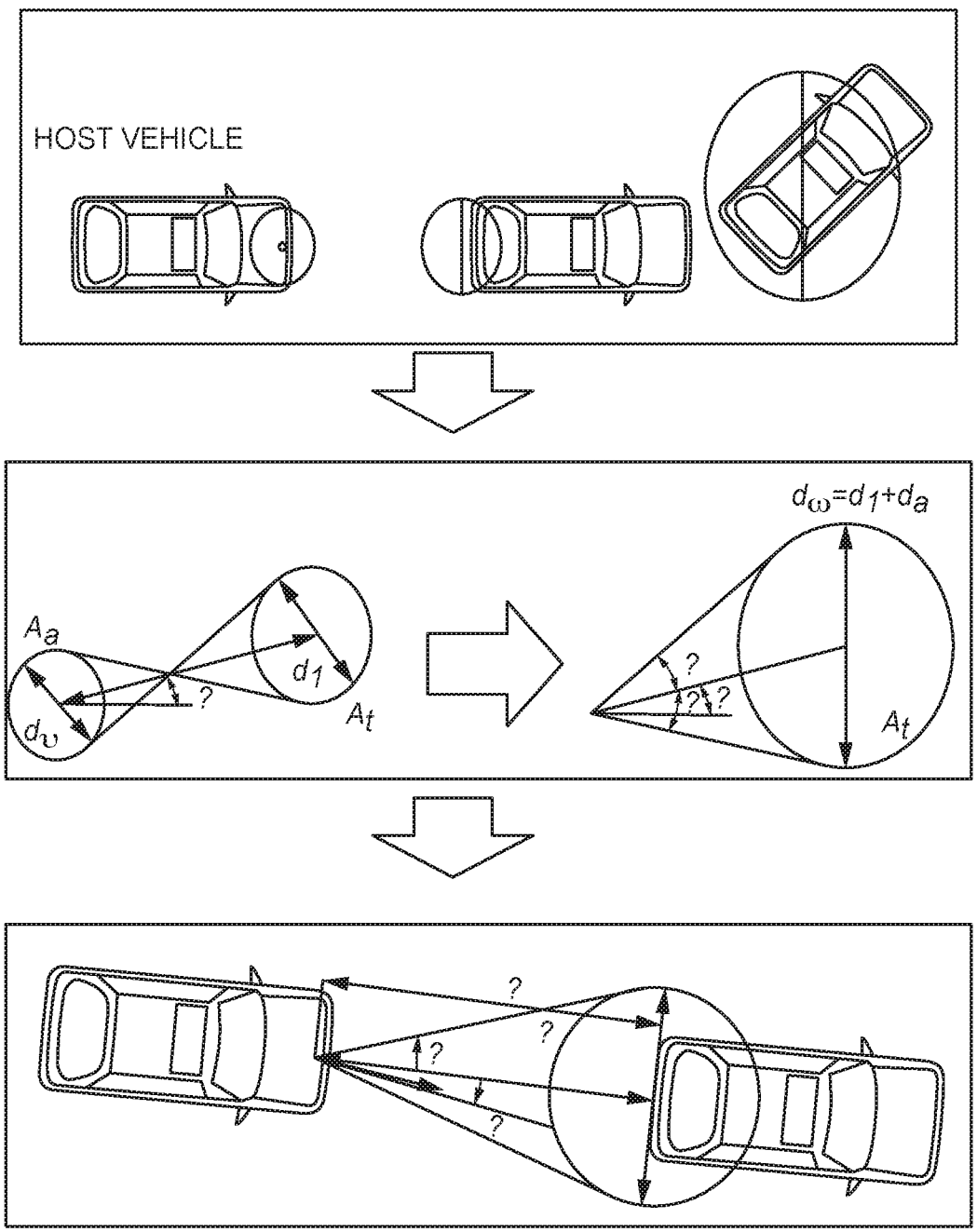
FIG. 4 is a conceptual diagram illustrating a method for primarily determining the possibility of collision with peripheral vehicles approaching in a direction transverse to a traveling direction of a host vehicle by establishing boundaries according to driving speeds of the host vehicle.

FIG. 4 is a conceptual diagram illustrating a method for primarily determining the possibility of collision with peripheral vehicles approaching in a direction transverse to the traveling direction of the host vehicle by establishing boundaries according to driving speeds of the host vehicle. Referring to FIG. 4, when the AVM sensor 20 detects a second object approaching in a direction transverse to the traveling direction of the host vehicle at crossroads during driving of the host vehicle, the boundary setting module 31 of the host vehicle may determine a first-vehicle size and a second-vehicle size, that are estimated based on widths of two vehicles (i.e., the first vehicle and the second vehicle) with respect to the movement directions of the two vehicles, to be diameters ($d_0$, $d_i$) of two circles, respectively, may acquire two straight lines contacting the crossroad from among the two circles, may acquire the sum ($d_0+d_i$) of diameters of the two circles with respect to not only a contact point of the two straight lines but also the center point ($A_0$) of a width of a front surface of the host vehicle, and may thus generate a boundary, a diameter of which is set to the sum ($d_0+d_i$). When an angle $\theta_{io}$ of the last motion vector is shown as represented by FIG. 4, if $\theta_{io} \in [\eta_{io}-\xi, \eta_{io}+\xi]$ is satisfied, the ECU 30 may primarily determine the high possibility of collision between the two vehicles. When the above primary decision of the higher possibility of collision is carried out, the following conditions denoted by $x_{io}=x_i-x_o=R_x$, $y_{io}=y_i-y_o=R_y$, $\dot{x}_{io}=\dot{x}_i-\dot{x}_o=V_x$, $\dot{y}_{io}=\dot{y}_i-\dot{y}_o=V_y$, $d_{io}=d_i+d_o$, $$\xi = \arcsin\frac{d_{io}}{2r_{io}}$$

and $r_{io}=\sqrt{x_{io}^2+y_{io}^2}$, $$\eta_{io} = \arctan\frac{y_{io}}{x_{io}}$$

need to be satisfied.

Figure 5:
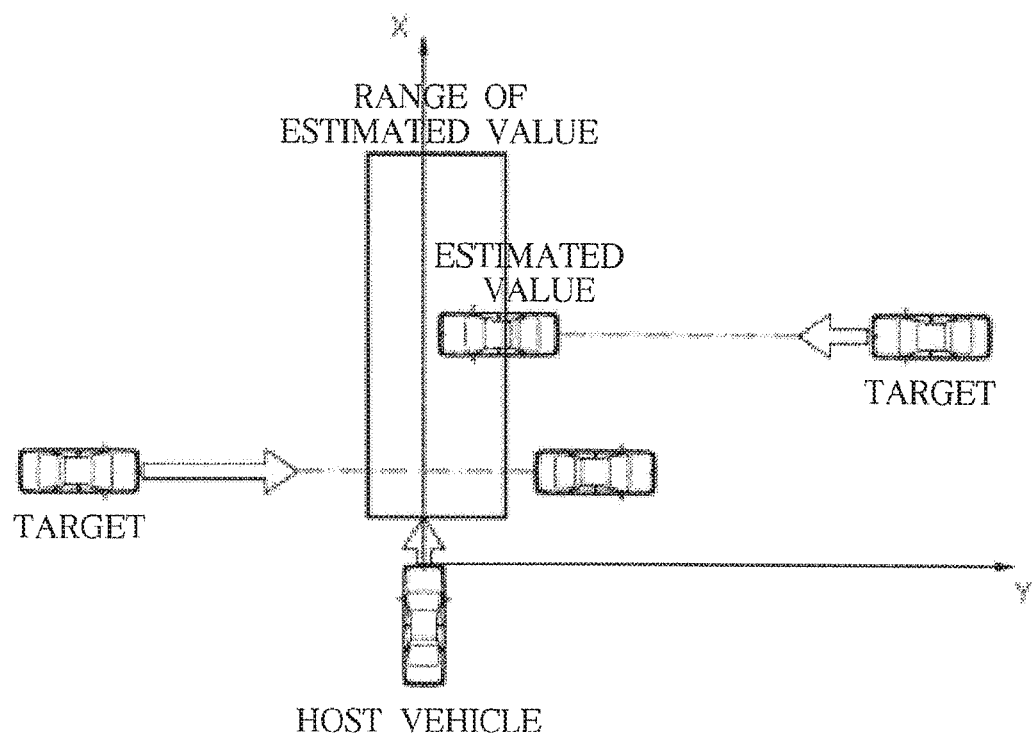
FIG. 5 is a conceptual diagram illustrating a method for secondarily determining the possibility of collision with peripheral vehicles by estimating the position of each peripheral vehicle approaching in a direction transverse to a traveling direction of a host vehicle.

FIG. 5 is a conceptual diagram illustrating a method for secondarily determining the possibility of collision with second objects by estimating the position of each second object approaching in a direction transverse to the traveling direction of the host vehicle. Referring to FIG. 5, the counterpart-vehicle position estimation module 32 may calculate a specific time at which the host vehicle meets the second object at the traveling-direction (X-axis) position of the host vehicle, and may thus estimate the position of the second object at a horizontal-direction (Y-axis) position with respect to the traveling direction of the host vehicle. If the estimated position of the second object is present in the traveling route of the host vehicle, the ECU 30 may secondarily determine the high possibility of collision between the host vehicle and the second object.

The collision warning device 40 may receive a control signal from the ECU 30, and may warn the driver of the high possibility of collision between the host vehicle and any obstacle present in a forward region of the host vehicle. The braking control device 50 may receive a control signal from the ECU 30, and may thus generate braking pressure of the host vehicle. The steering control device 50 may receive a control signal from the ECU 30, and may thus generate a steering angle of the steering wheel.

When one or more moving objects approaching in a direction transverse to the traveling direction of the host vehicle at crossroads are detected, the present disclosure provides a method for allocating different priorities to the moving objects, and selecting a control object from among the moving objects according to the priority information.

An autonomous emergency braking (AEB) method of a host vehicle at crossroads using the above-mentioned system will hereinafter be described with reference to FIG. 2.

Figure 2:
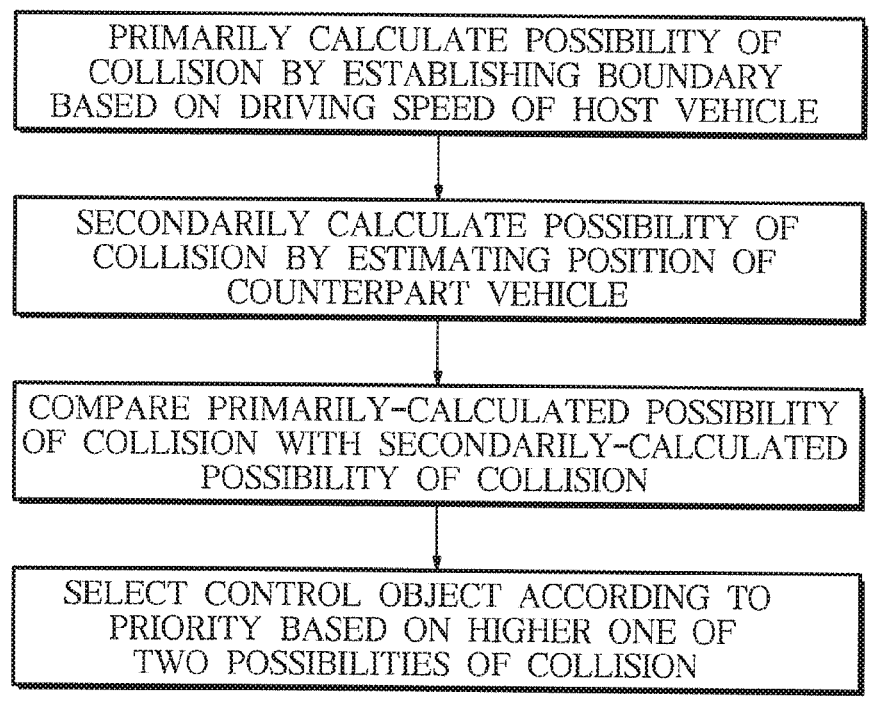
FIG. 2 is a flowchart illustrating an autonomous emergency braking (AEB) method according to an embodiment of the present disclosure.
Figure 3:
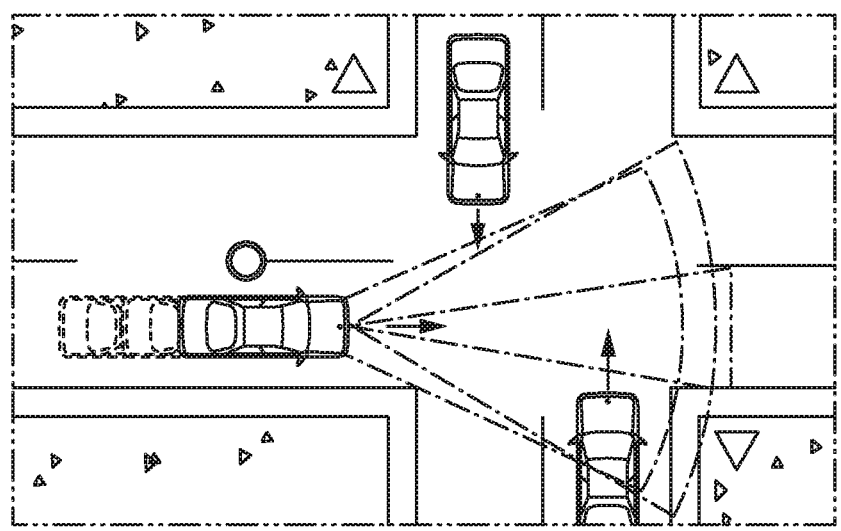
FIG. 3 is a conceptual diagram illustrating peripheral vehicles approaching in a direction transverse to a traveling direction of a host vehicle at crossroads.

Referring to FIG. 2, the ECU 30 may receive detection signals from the vehicle dynamics sensor 10 and the AVM sensor 20, may establish a boundary according to a driving speed of the host vehicle when one or more moving objects approaching in a direction transverse to the traveling direction of the host vehicle are detected, and may thus primarily determine whether there is a high possibility of collision between the host vehicle and the moving objects (S210). The ECU 30 may estimate the position of second objects, and may secondarily determine whether there is a high possibility of collision between the host vehicle and the second objects (S220). The method for determining whether there is a high possibility of collision between the host vehicle and the second objects by establishing the boundary according to driving speed of the host vehicle in the above steps S210 and S220 and the method for determining whether there is a high possibility of collision by estimating the position of the second objects have already been disclosed as described above.

Thereafter, the ECU 30 may compare the primarily-calculated possibility of collision based on the boundary established in step S210 with the secondarily-calculated possibility of collision based on the position estimated in step S220 (S230), and may select a control object from among the second objects by allocating different priorities to the second objects with respect to a higher one of two possibilities of collision (i.e., the primarily-calculated possibility of collision and the secondarily-calculated possibility of collision) (S240). The ECU 30 may warn the driver of the high possibility of collision based on the possibility of collision with the selected control object, or may perform autonomous emergency braking (AEB) as necessary.

As is apparent from the above description, the autonomous emergency braking (AEB) system and method of a vehicle at crossroads according to the embodiments of the present disclosure may allocate priority to one or more moving objects when the moving objects approaching in a direction transverse to a traveling direction of a host vehicle are detected at crossroads, may select a control object from among the moving objects based on the allocated priority information, and may warn a driver of the host vehicle about the possibility of collision with the selected control object or perform autonomous emergency braking, resulting in increased driving safety of the host vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An autonomous emergency braking (AEB) system comprising:
    a monitoring sensor configured to obtain detection information for calculating a distance between a host vehicle and a peripheral object and a relative speed of the peripheral object and transmit the information to an electronic control unit (ECU); and
    the electronic control unit (ECU) configured to:
        receive detection information from the monitoring sensor,
        determine a presence of a moving object, among peripheral objects, moving toward the host vehicle in a direction transverse to a current traveling direction of the host vehicle at crossroads during driving of the host vehicle,
        estimate, if the presence of the moving object is determined, a time to collision (TTC) between the host vehicle and the moving object,
        select the moving object as a control object using the detection information and
        if the TTC between the control object and the host vehicle is lower than a threshold, warn a driver of the host vehicle or perform autonomous emergency braking (AEB) of the host vehicle based on the TTC between the host vehicle and the selected control object.

2. The autonomous emergency braking (AEB) system according to claim 1, wherein ECU is configured to estimate the TTC between the host vehicle and the moving object by:
    establishing a collision boundary according to a driving speed of the host vehicle,
    estimating a position of the detected moving object based on the detection information, and
    determining the time to collision based on the estimate position of the moving object and the collision boundary.

3. The autonomous emergency braking (AEB) system according to claim 1, wherein, if a presence of a second moving object is determined, the ECU is configured to:
    determine a first TTC with the control object by establishing a boundary according to a driving speed of the host vehicle,
    determine a second TTC with the second object by estimating a position of the second object,
    compare the first TTC and the second TTC, and
    warn the driver of the host vehicle or performs autonomous emergency braking (AEB) with respect to a lower one of the first TTC and the second TTC.

4. The autonomous emergency braking (AEB) system according to claim 2, wherein, if a presence of second objects is determined, the ECU is configured to:
    determine a first TTC with the control object,
    determine a second TTC with each of the second objects by estimating the position of each second object,
    compare the first TTC with each of the second TTC,
    determine priorities for the second objects based on the second TTCs,
    select an object with a lowest TTC among the second objects as the control object from among the second objects, and
    warn the driver or perform autonomous emergency braking (AEB) based on the determined priorities.

5. The autonomous emergency braking (AEB) system according to claim 3, wherein the electronic control unit (ECU) is configured to determine a specific time at which the host vehicle meets the second object at a traveling direction position of the host vehicle, and estimates the position of the second object at a transverse-direction position with respect to the traveling direction of the host vehicle.

6. An autonomous emergency braking (AEB) method comprising:

detecting moving objects moving toward a host vehicle in a direction transverse to a current traveling direction of the host vehicle at crossroads during driving of the host vehicle, receiving a driving speed of a host vehicle;

receiving a distance, and a relative speed between the host vehicle and each of the moving objects or peripheral images, from one or more sensors;

establishing a collision boundary based on the driving speed of the host vehicle;

estimating positions of detected the moving objects;

determining a time to collision (TTC) between the host vehicle and each of the moving objects based on the estimated positions of each of the moving objects and the collision boundary;

selecting a control object among the detected moving objects based on the ITC; and warning a driver of the host vehicle or performing autonomous emergency braking (AEB) of the host vehicle.

7. The autonomous emergency braking (AEB) method according to claim 6, wherein the selecting the control object includes: selecting one of the moving objects having a lowest TTC as the control object.

8. The autonomous emergency braking (AEB) method according to claim 6, wherein the determining the TTC includes:

determining a specific time at which the host vehicle meets the vehicle given moving object at a traveling-direction position of the host vehicle; and estimating the position of the each moving object at a transverse-direction position with respect to the traveling direction of the host vehicle.

9. An autonomous emergency braking (AEB) system comprising:

a monitoring sensor configured to obtain detection information for calculating a distance between the host vehicle and moving objects and a relative speed of the moving objects, and transmit the information to the ECU; and the ECU configured to:

determine a time to collision (TTC) of the host vehicle with each detected moving object moving toward the host vehicle in a direction transverse to a current traveling direction of the host vehicle;

select an object among the detected moving objects having a smallest TTC as a control object; and provide a warning signal to a driver of the host vehicle or perform AEB of the host vehicle based on the TTC between the host vehicle and the control object.

10. The autonomous emergency braking (AEB) system of claim 9, wherein the TTC is determined by:

establishing a collision boundary based on a driving speed of the host vehicle, estimating positions of the detected moving objects based on the detection information, and determining the TTC with each of the detected moving objects based on an estimated position of a corresponding moving object and the collision boundary.

11. The autonomous emergency braking (AEB) system of claim 9, wherein the ECU is further configured to assign a priority to each of the detected moving objects based of a corresponding TTC relative to that of the control object.

12. The autonomous emergency braking (AEB) system of claim 9, wherein the ECU is further configured to determine the TTC continuously as the host vehicle approaches a crossroad, and select, if another detected object has a TTC smaller than that of the control object, the other object as a new control object.

13. The autonomous emergency braking (AEB) system of claim 12, wherein the ECU is further configured to reassign a priority to each of the detected moving objects based on a corresponding TTC relative to that of the new control object.

14. The autonomous emergency braking (AEB) system of claim 9, wherein the ECU is configured to determine a specific time at which the host vehicle meets each of the detected moving objects at a traveling-direction position of the host vehicle, and estimate a position of each of the detected moving object at a transverse direction position with respect to the traveling direction of the host vehicle.

* * * * *